(12) United States Patent
Yamasaki

(10) Patent No.: US 8,919,195 B2
(45) Date of Patent: Dec. 30, 2014

(54) ENVIRONMENT PROVIDING DEVICE, ENVIRONMENT PROVIDING METHOD, AND PARTICLE DETECTING DEVICE EVALUATING METHOD

(71) Applicant: AZBIL Corporation, Tokyo (JP)

(72) Inventor: Shinsuke Yamasaki, Tokyo (JP)

(73) Assignee: AZBIL Corporation, Tokyo (JP)

( * ) Notice: Subject to any disclaimer, the term of this patent is extended or adjusted under 35 U.S.C. 154(b) by 127 days.

(21) Appl. No.: 13/644,791

(22) Filed: Oct. 4, 2012

(65) Prior Publication Data

US 2013/0081478 A1    Apr. 4, 2013

(30) Foreign Application Priority Data

Oct. 4, 2011    (JP) .................................. 2011-220146

(51) Int. Cl.
| | |
|---|---|
| *G01F 13/00* | (2006.01) |
| *B05B 12/02* | (2006.01) |
| *G01F 1/692* | (2006.01) |
| *G01F 1/699* | (2006.01) |
| *G05D 7/06* | (2006.01) |

(52) U.S. Cl.
CPC ................ *B05B 12/02* (2013.01); *G01F 13/00* (2013.01); *G01F 1/692* (2013.01); *G01F 1/699* (2013.01); *G05D 7/0635* (2013.01)
USPC ......... 73/299; 73/19.04; 73/23.24; 73/864.35

(58) Field of Classification Search
CPC ............ G01N 1/14; G01N 2030/3015; G01N 2030/3076; G06F 3/0482; A61B 17/320016; A61B 18/18
USPC .......................... 73/299, 19.04, 23.24, 864.35
See application file for complete search history.

(56) References Cited

U.S. PATENT DOCUMENTS

| | | | | | |
|---|---|---|---|---|---|
| 4,045,998 | A | * | 9/1977 | Ford .............................. | 73/23.24 |
| 4,121,907 | A | * | 10/1978 | Roque ........................... | 356/246 |
| 6,485,569 | B1 | * | 11/2002 | Sarakas ......................... | 118/303 |
| 2002/0007869 | A1 | * | 1/2002 | Pui et al. ....................... | 141/173 |
| 2004/0245354 | A1 | * | 12/2004 | Srinivasan ...................... | 239/74 |
| 2011/0067505 | A1 | * | 3/2011 | Page et al. .................... | 73/863.23 |

FOREIGN PATENT DOCUMENTS

| | | |
|---|---|---|
| JP | 2004-159508 | 6/2004 |
| JP | 2008-022764 | 2/2008 |
| JP | 2008-022765 | 2/2008 |

\* cited by examiner

*Primary Examiner* — Peter Macchiarolo
*Assistant Examiner* — Mohammed Keramet-Amircola
(74) *Attorney, Agent, or Firm* — Troutman Sanders LLP

(57) ABSTRACT

An environment providing device having a test chamber; a spraying device for receiving the supply of a gas flow to spray, into the test chamber, a fluid that contains particles; a flow meter for measuring a measured value for the flow rate of the gas flow that is supplied to the spraying device; a flow rate controlling device for controlling to a prescribed value, based on the measured value, the flow rate of the gas flow that is supplied to the spraying device; a timer for measuring a time interval over which the fluid that includes the particles has been sprayed into the test chamber; and a spraying-device-controlling device for stopping the spraying of the fluid that contains the particles after spraying a prescribed quantity of particles into the test chamber.

15 Claims, 5 Drawing Sheets

ENVIRONMENT PROVIDING DEVICE, ENVIRONMENT PROVIDING METHOD, AND PARTICLE DETECTING DEVICE EVALUATING METHOD

CROSS-REFERENCE TO PRIOR APPLICATION

This application claims priority to Japanese Patent Application No. 2011-220146, filed Oct. 4, 2011. This application is incorporated herein by reference in its entirety.

FIELD OF TECHNOLOGY

The present invention relates to a technology for evaluating an environment, and, in particular, relates to an environment providing device, an environment providing method, and a particle detecting device evaluating method.

BACKGROUND

In, for example, clean rooms in semiconductor manufacturing factories, the quantity of particles dispersed in the air within the room is monitored using a particle detecting device. In research and development of particle detecting devices, the correspondence between the quantity of particles dispersed in the air within the test environment and the results of detection by the particle detecting device is examined. At this time, it is desirable to be able to control accurately the quantity of particles dispersed in the air in the test environment. (See, for example, Japanese Unexamined Patent Application Publication 2004-159508, Japanese Unexamined Patent Application Publication 2008-22764, and Japanese Unexamined Patent Application Publication 2008-22765.)

SUMMARY

Given this, the present invention has, as one of the objects thereof, the provision of an environment providing device, an environment providing method, and a particle detecting device evaluating method, able to provide an environment wherein the quantity of particles dispersed in the air can be controlled accurately.

A form of the present invention provides an environment providing device having (a) a test chamber; (b) a spraying device for receiving a supply of a gas flow and spraying, into the test chamber, a fluid that contains particles; (c) a flow meter for measuring a measured value for a flow rate of the gas flow that is supplied to the spraying device; (d) a flow rate controlling device for controlling, to a prescribed value, based on the measured value, the flow rate of the gas flow that is supplied to the spraying device; (e) a timer for measuring a time interval over which the fluid that contains the particles is sprayed into the test chamber; and (f) a spraying-device-controlling device for stopping the spraying of the fluid that includes the particles after spraying a prescribed quantity of particles into the test chamber.

Moreover, a form of the present invention provides an environment providing method including: (a) supplying a gas flow to a spraying device and spraying, into a test chamber, a fluid that includes particles; (b) measuring a measured value for a flow rate of the gas flow that is supplied to the spraying device; (c) controlling, to a prescribed value, based on the measured value, the flow rate of the gas flow that is supplied to the spraying device; (d) measuring a time interval over which the fluid that includes the particles has been sprayed into the test chamber; and (e) stopping spraying of the fluid that contains the particles after spraying a prescribed quantity of particles into the test chamber.

Moreover, a form of the present invention provides a particle detecting device evaluating method including: (a) supplying a gas flow to a spraying device and spraying, into a test chamber, a fluid that includes particles; (b) measuring a measured value for a flow rate of the gas flow that is supplied to the spraying device; (c) controlling, to a prescribed value, based on the measured value, the flow rate of the gas flow that is supplied to the spraying device; (d) measuring a time interval over which the fluid that includes the particles has been sprayed into the test chamber; (e) stopping spraying of the fluid that contains the particles after spraying a prescribed quantity of particles into the test chamber; (f) detecting particles dispersed in the air in the test chamber, using a particle detecting device; and (g) evaluating the quantity of particles detected by the particle detecting device.

The present invention enables the provision of an environment providing device, an environment providing method, and a particle detecting device evaluating method, able to provide an environment wherein the quantity of particles dispersed in the air is controlled accurately.

DETAILED DESCRIPTION

Figure 1:
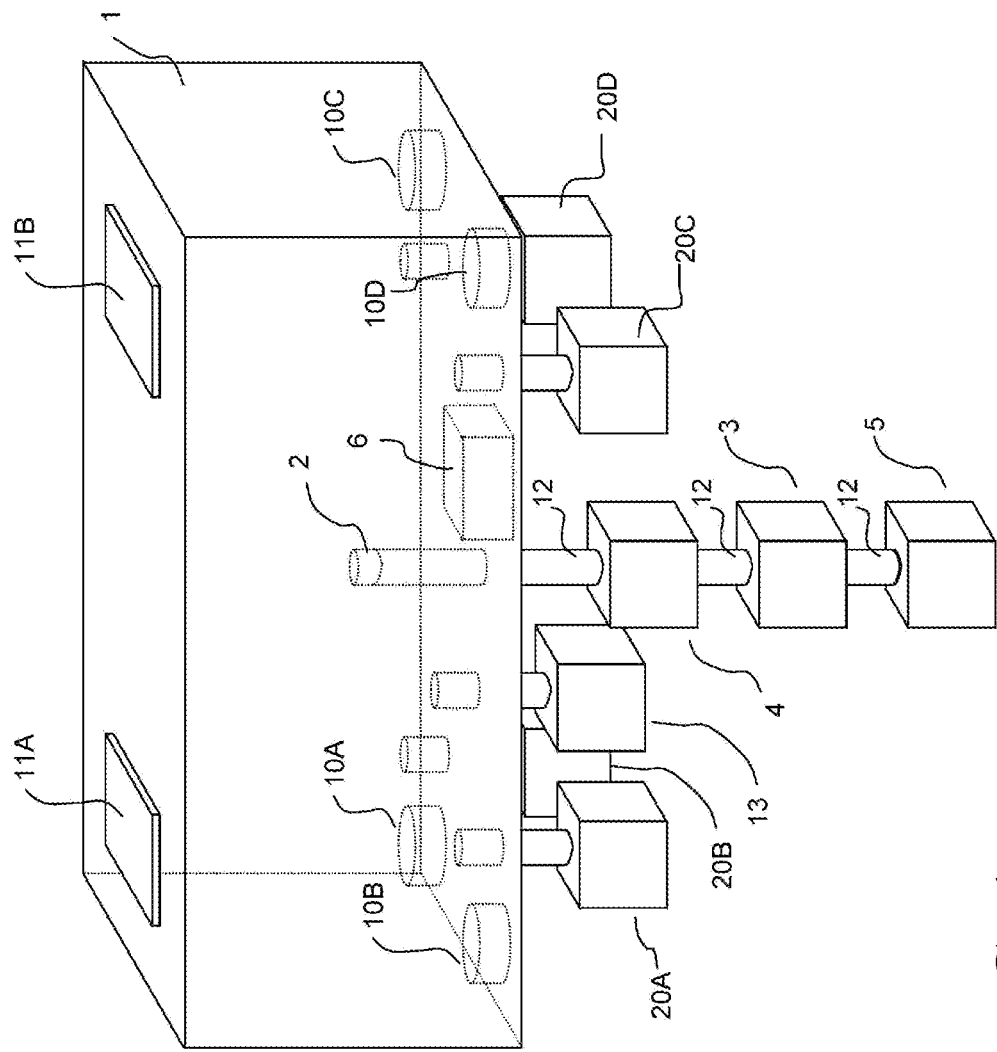
FIG. 1 is a schematic diagram of an environment providing device according to an example according to the present invention.
Figure 2:
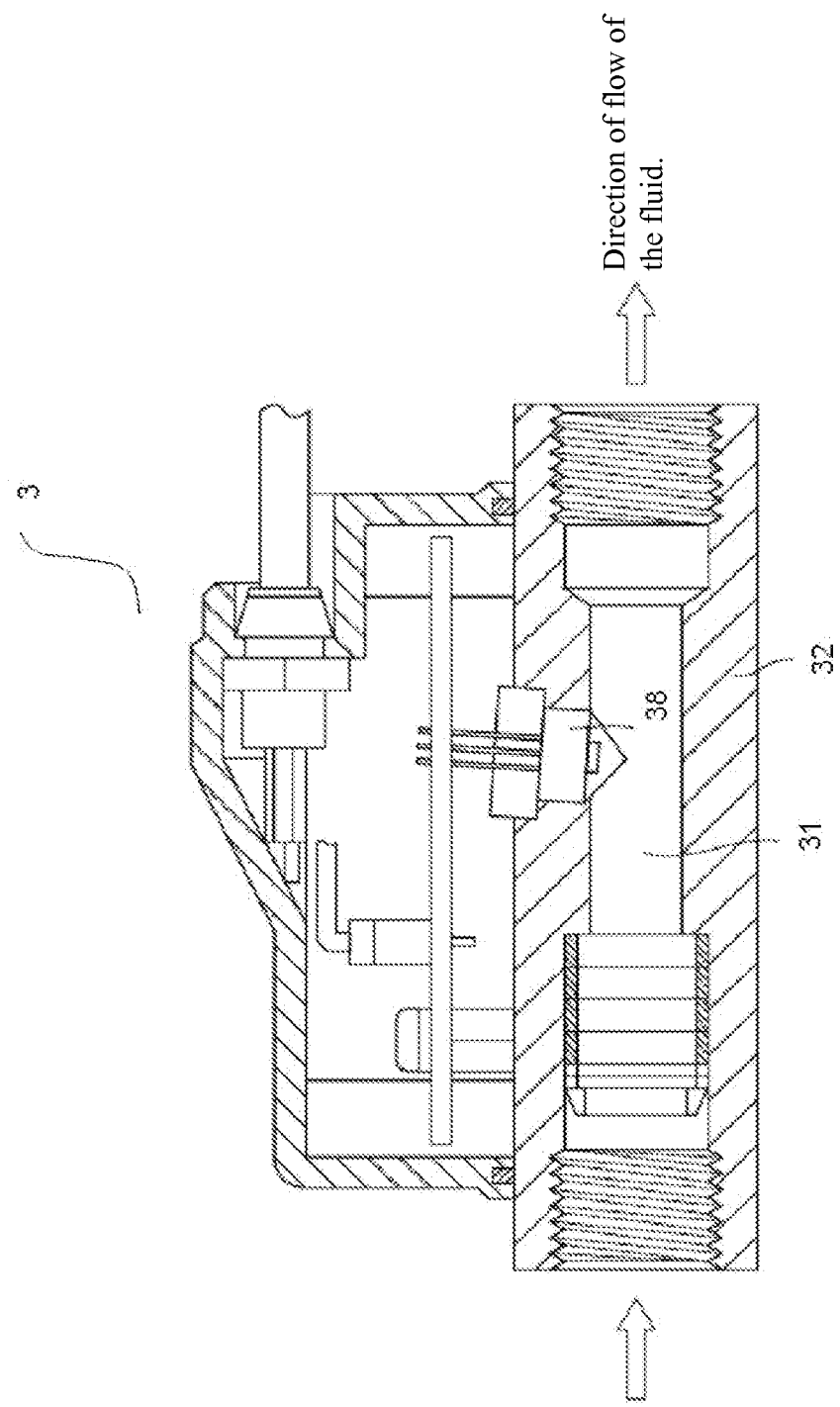
FIG. 2 is a cross-sectional diagram of a flow meter according to another example according to the present invention.
Figure 3:
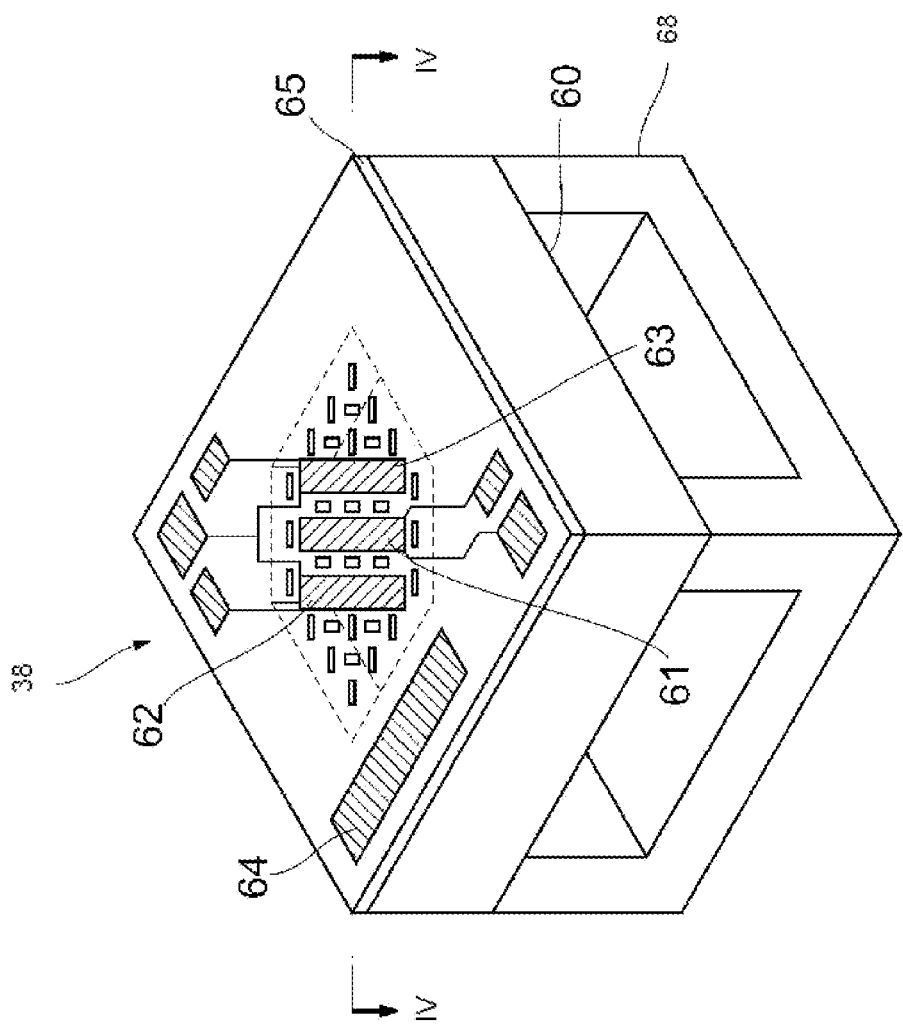
FIG. 3 is a perspective diagram of a flow sensor according to a further example according to the present invention.
Figure 4:
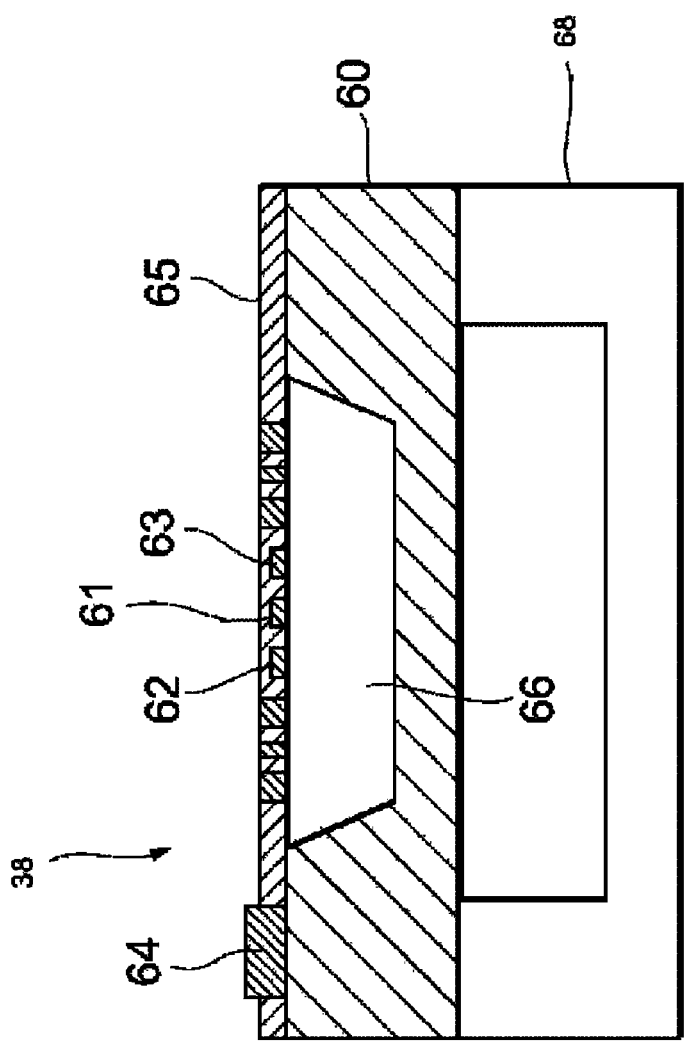
FIG. 4 is a cross-sectional diagram along the section IV-IV of the flow sensor illustrated in FIG. 3.
Figure 5:
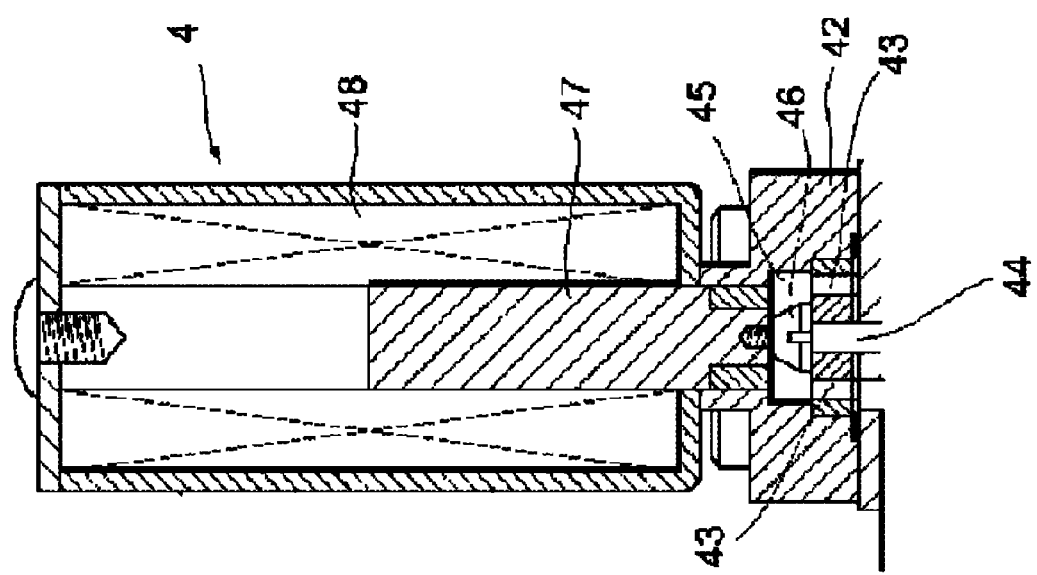
FIG. 5 is a cross-sectional diagram of a flow rate controlling device according to yet another example according to the present invention.

Examples according to the present invention are explained below. In the annotations in the drawings, identical or similar parts are marked with identical or similar codes, below. Note that the drawings are schematic. Consequently, specific dimensions, and the like, are to be determined in light of the explanation below. Moreover, there are, of course, places wherein the dimensional relationships and ratios differ from drawing to drawing.

The environment providing device according to the form of embodiment illustrated in FIG. 1 comprises: a test chamber 1; a spraying device 2 for receiving the supply of a gas flow to spray, into the test chamber 1, a fluid that contains particles; a flow meter 3 for measuring a measured value for the flow rate of the gas flow that is supplied to the spraying device 2; a flow rate controlling device 4 for controlling, based on the measured value, the flow rate of the gas flow that is supplied to the spraying device 2; a timer for measuring a time interval over which the fluid that includes the particles has been sprayed into the test chamber 1; and a spraying-device-controlling device for stopping the spraying of the fluid that contains the particles after spraying a prescribed quantity of particles into the test chamber 1.

The test chamber 1 is a chamber that is provided with, for example, an aluminum frame and transparent panels, made from polycarbonate, fitted into the frame to serve as side walls. Note that the form of the test chamber 1 may be a duct, or the like. The interior volume of the test chamber 1 is, for example, 3 m³, but there is no limitation thereto. Air supplying devices 11A and 11B, for example, are provided in the test chamber 1. The air supplying devices 11A and 11B supply, into the test chamber 1, clean air through ultrahigh performance air filters such as HEPA filters (High Efficiency Particulate Filters) or ULPA filters (Ultra Low Penetration Air Filters), or the like. A door may be provided in a side wall of the test chamber 1.

The spraying device 2 is a jet-type nebulizer, and stores a fluid that includes particles at a specific concentration. Particles that are included in the fluid are microorganisms such as bacteria, funguses, viruses, allergen substances, or the like. Conversely, the particles that are included in the fluid may be, for example, non-toxic or toxic chemical substances. Conversely, the particles that are included in the fluid may be dust particles. The spraying device 2 is supplied with a gas flow, such as a compressed gas, or the like, at a specific flow rate, to produce an aerosol through spraying the fluid that contains the particles with the gas flow, to spray, in the form of a mist, the fluid that contains the particles into the test chamber 1. Note that while in the FIG. 1 the spraying device 2 is disposed within the test chamber 1, the spraying device 2 may instead be disposed on the outside of the test chamber 1, with the aerosol that is sprayed by the spraying device 2 directed into the test chamber 1 through ducting, or the like.

The environment providing device according to the present example is further provided with a storage tank 5 for storing a compressed gas. The storage tank 5, the flow meter 3, the flow rate controlling device 4, and the spraying device 2 are connected by pipes 12, for example. Moreover, in order to remove particles, and the like, that are included in the compressed gas, an ultrahigh performance filter, such as a HEPA filter, or the like, is provided between the storage tank 5 and the flow rate meter 3. Note that the storage tank 5 may be replaced with a compressed gas supplying source, such as a compressor or a pump.

The flow meter 3 may use a mass flow meter, or the like, to measure a measured value for the flow rate of the compressed gas that is supplied from the storage tank 5. As illustrated in FIG. 2, the flow meter 3 is provided with a frame 32 in which is provided a pipe-like flow path 31 that is connected to the pipe 12, and a flow sensor 38 for detecting the flow rate of the compressed gas that flows in the flow path 31. The flow sensor 38 illustrated in FIG. 3 and FIG. 4 is provided with a substrate 60, which is provided with a cavity 66, and an electrically insulating film 65 that is disposed on the substrate 60 so as to cover the cavity 66. The thickness of the substrate 60 is, for example, 0.5 mm. Moreover, the lengthwise and crosswise dimensions of the substrate 60 are each about 1.5 mm. The part of the electrically insulating film 65 that covers the cavity 66 forms a thermally insulating diaphragm. Moreover, the flow sensor 68 is provided with a heat generating element 61 that is provided in the diaphragm part of the insulating film 65, a first temperature measuring element 62 and a second temperature measuring element 63 that are provided at the diaphragm part of the insulating film 65 so as to have the heat generating element 61 interposed therebetween, and a temperature maintaining element 64 that is provided on the substrate 60.

The heat generating element 61 is provided in the center of the diaphragm part of the insulating film 65 that covers the cavity 66. In the heat generating element 61 is, for example, a resistor, to generate heat through the application of electric power, to heat the compressed gas that contacts the heat generating element 61. The first temperature measuring element 62 and the second temperature measuring element 63 are electronic elements such as passive elements such as, for example, resistors, or the like, to output electric signals in accordance with the temperature of the compressed gas. The first temperature measuring element 62 is used to detect the temperature in the flow path 31 on the upstream side from the heat generating element 61, and the second temperature measuring element 63 is used to detect the temperature in the flow path 31 on the downstream side from the heat generating element 61.

When the gas within the flow path 31 that is illustrated in FIG. 2 is stationary, the heat that is applied to the compressed gas from the heat generating element 61 that is illustrated in FIG. 3 and FIG. 4 can propagate symmetrically in the upstream direction and the downstream direction. Consequently, the temperatures in the first temperature measuring element 62 and the second temperature measuring element 63 can be equal, and the electrical resistances in the first temperature measuring element 62 and the second temperature measuring element 63, which are made out of platinum, or the like, can be equal. In contrast, when there is a flow of the compressed gas from upstream to downstream in the flow path 31 illustrated in FIG. 2, the heat that is applied to the compressed gas from the temperature-measuring element 61 that is illustrated in FIG. 3 and FIG. 4 can be carried in the downstream direction by the compressed gas. Consequently, the temperature of the second temperature measuring element 63 on the downstream side can be higher than the temperature of the first temperature measuring element 62 on the upstream side. Because of this, a difference can be produced between the electrical resistance of the first temperature measuring element 62 and the electrical resistance of the second temperature measuring element 63. The difference between the electrical resistance of the second temperature measuring element 63 and the electrical resistance of the first temperature measuring element 62 can be correlated with the speed of the compressed gas within the flow path 61 that is illustrated in FIG. 2. Because of this, the flow rate of the compressed gas that flows in the flow path 31 can be calculated from the difference between the electrical resistance of the second temperature measuring element 63 and the electrical resistance of the first temperature measuring element 62.

The temperature maintaining element 64, illustrated in FIG. 3 and FIG. 4, is, for example, a resistor, which is provided with electric power to generate heat to maintain the substrate 60 at a constant temperature. Silicon (Si), or the like, may be used as the material for the substrate 60. Silicon oxide ($SiO_2$), or the like, may be used as the material for the electrically insulating film 65. The cavity 66 is fabricated through, for example, anisotropic etching. Moreover, platinum (Pt), or the like, may be used as the material for the heat generating element 61, the first temperature measuring element 62, the second temperature measuring element 63, and the heat maintaining element 64, and may be formed through a lithographic method, or the like.

The flow sensor 38 is secured in the flow path 31, illustrated in FIG. 2, by a thermally insulating material 68 made from glass, or the like, that is disposed on the bottom face of the flow sensor 38. Securing the flow sensor 38 in the flow path 31 through the thermally insulating material 68 reduces the susceptibility of the temperature of the flow sensor 38 to the effects of temperature fluctuations of the inner wall of the flow path 31.

The flow rate controlling device 4 illustrated in FIG. 1 controls, to a prescribed value, the flow rate of the compressed gas that flows in the pipe 12, based on the measured value for the flow rate that is measured by the flow meter 3. As illustrated in FIG. 5, the flow rate controlling device 4 is provided with a valve seat that is provided with a flow path 43, a flow path 44, and a valve chamber 45 provided between the flow path 43 and the flow path 44. Moreover, the flow rate controlling device 4 is provided with a plunger 47 of a magnetic substance, a solenoid coil 48 to which an electric current is applied to drive the plunger 47 up and down, and a valve body 46, housed within the valve chamber 45, that is connected to the plunger 47 to open and close the flow path 44.

If, for example, the measured value for the flow rate of the compressed gas, measured by the flow meter 3, is greater than the prescribed value, then the flow rate controlling device 4 can apply an electric current to the solenoid coil 48, to reduce the gap between the valve body 46 and the valve seat 42, to reduce the flow rate of the compressed gas. Moreover, if the measured value for the flow rate of the compressed gas, measured by the flow meter 3, is less than the prescribed value, the flow rate controlling device 4 can apply an electric currents to the solenoid 48 to increase the gap between the valve body 46 and the valve seat 42, to increase the flow rate of the compressed gas. Doing so controls, to the vicinity of the prescribed value, the flow rate of the compressed gas that flows through the pipe 12 to be supplied to the spraying device 2. Note that while in FIG. 1 the flow rate controlling device 4 is disposed downstream from the flow meter 3, the flow rate controlling device 4 may instead be disposed upstream from the flow meter 3.

Agitating fans 10A, 10B, 10C, and 10D are disposed as agitating devices within the test chamber 1. The agitating fans 10A through 10D agitate the air within the test chamber 1, to prevent natural settling, by their own weight, of the particles that are dispersed into the air within the test chamber 1.

Moreover, an air cleaner 6, as a cleaning device, is disposed within the test chamber 1. The air cleaner 6 removes particles that are included in the gas, such as air, or the like, within the test chamber 1, to clean the gas. For example, the air cleaner 6 is operated prior to spraying of the fluid, which includes the particles from the spraying device 2 into the test chamber 1, to remove, from the test chamber 1, any particles other than the particles that are sprayed from the spraying device 2. Note that while in FIG. 1 the air cleaner 6 is disposed on the bottom surface within the test chamber 1, the air cleaner 6 may instead be disposed on a wall or the ceiling of the test chamber 1.

Furthermore, a particle counter 13 is disposed in the test chamber 1. The particle counter 13 measures the quantity of particles within the test chamber 1 in terms of a number, a density, a concentration, or the like. A light-scattering automated particle counter, or the like, may be used for the particle counter 13.

Moreover, particle detecting devices 20A, 20B, 20C, and 20D, for example, for which the particle detecting performance is tested, are disposed in the test chamber 1. Each of the particle detecting devices 20A through 20D draw in air from within the test chamber 1 to detect particles, to measure a quantity such as the number, density, or concentration of particles dispersed in the air within the test chamber 1. For example, the ratios of the measured values for the quantity of particles by each of the individual particle detecting devices 20A through 20D relative to the measured value for the quantity of particles by the particle counter 13 are evaluated as the particle detecting performances of the respective particle detecting devices 20A through 20D.

A timer that is, for example, connected to the spraying device 2, measures the time from when the spraying device 2 begins spraying. For example, the spraying-device-controlling device that is connected to the spraying device 2 sets the time for stopping the spraying device 2 from spraying the fluid based on the product of the compressed gas flow rate and the time with which the fluid is sprayed, which are set in advance. Specifically, the spraying-device-controlling device sets the time interval with which to stop the spraying device 2 from spraying to a time interval that is obtained by dividing, by the measured value for the compressed gas flow rate, which is measured in real time by the flow meter 3, the product of a compressed gas flow rate and the time interval over which the fluid is to be sprayed. At the point in time that the time interval that is measured by the timer reaches the time interval that has been set for stopping the spraying of the fluid by the spraying device 2, the spraying-device-controlling device controls the spraying device 2 to stop spraying of the fluid from the spraying device 2. Note that the spraying-device-controlling device may stop the spraying of the fluid from the spraying device 2 through controlling the flow rate controlling device 4.

The environment providing device according to example set forth above enables the product of the flow rate of the compressed gas that is supplied to the spraying device 2 and the time interval over which the fluid that contains the particles is sprayed into the test chamber 1 to be uniform each time a test, from a plurality of tests, is performed. Because of this, if the concentration of the particles included in the fluid that is stored in the spraying device 2 is uniform, then it can be possible to cause the quantity of particles that are supplied into the test chamber 1 to be uniform each time a test, of a plurality of tests, is performed. Here, if the quantity of particles dispersed in the air in the test chamber are different each time a particle detecting device 20A through 20D is tested, then it can be difficult to evaluate accurately the particle detecting performance of each of the particle detecting devices 20A through 20D. Because of this, it is desirable for the quantity of particles dispersed in the air within the test chamber 1 to not change each time a particle detecting device 20A through 20D is tested. In this regard, the environment providing device according to the present form of embodiment enables the provision of identical test environments with excellent repeatability.

While the present invention has been described through an example, above, the descriptions and drawings which comprise a portion of this disclosure must be understood to not limit this invention. From this disclosure, a variety of alternate examples and application technologies should be clear to one skilled in the art. For example, an example was given wherein the spraying device 2 illustrated in FIG. 1 was a jet-type nebulizer, there is no limitation thereto insofar as it is possible to spray, into the test chamber 1, a fluid that contains particles, doing so through the receipt of a supply of a gas flow. Moreover, while an example was given wherein the particle detecting devices 20A, 20B, 20C, and 20D were disposed on the bottom surface of the test chamber 1, the particle detecting devices 20A, 20B, 20C, and 20D may be placed instead on a side surface of the test chamber 1.

Furthermore, while an example was given wherein a mass flow sensor was used as the flow meter 3, other types of flow meters may be used instead. Furthermore, the explanation was for an example wherein the spraying-device-controlling device used, as the timing for stopping the spraying of the fluid from the spraying device 2 a time interval obtained through dividing, by a measured value for the flow rate of the compressed gas, measured by the flow meter 3, the product of a compressed gas flow rate and a time interval for spraying the fluid, which were set in advance. In contrast, a time interval obtained through dividing, by a prescribed value for the flow rate that is set by the flow rate controlling device 4, the product of the compressed gas flow rate and the time interval over which the fluid is sprayed, which are set in advance, may be set as the timing for stopping the spraying of the fluid by the spraying device 2.

I claim:

1. An environment providing device comprising:
   a test chamber;
   a spraying device receiving a supply of a gas flow and spraying, into the test chamber, a fluid that includes particles;
   a flow meter measuring a measured value for the flow rate of the gas flow that is supplied to the spraying device;
   a flow rate controlling device controlling, to a prescribed value, based on the measured value, the flow rate of the gas flow that is supplied to the spraying device;
   a timer measuring a time interval over which the fluid that contains the particles is sprayed into the test chamber; and
   a spraying-device-controlling device stopping the spraying of the fluid that contains the particles after a prescribed quantity of the particles has been sprayed into the test chamber.

2. The environment providing device as set forth in claim 1, wherein:
   the spraying-device-controlling device sets a time interval for stopping the spraying of the fluid that contains the particles, based on a product of a flow rate of the gas flow and a time interval over which the fluid that contains the particles is to be sprayed.

3. The environment providing device as set forth in claim 1, wherein:
   the spraying-device-controlling device sets, as a time interval for stopping the spraying of the fluid that contains the particles, a time interval that is obtained through dividing, by a measured value, measured by the flow meter, for the flow rate of the gas flow that is controlled, a product of product of a flow rate of the gas flow and a time interval over which the fluid that contains the particles is to be sprayed.

4. The environment providing device as set forth in claim 1, wherein:
   the spraying-device-controlling device sets, as a time interval for stopping the spraying of the fluid that contains the particles, a time interval that is obtained through dividing, by a prescribed value for the flow rate of the gas flow that is controlled by the flow rate controlling device, a product of product of a flow rate of the gas flow and a time interval over which the fluid that contains the particles is to be sprayed.

5. The environment providing device as set forth in claim 1, wherein:
   the particles are microorganisms particles.

6. An environment providing method, comprising the steps of:
   supplying a gas flow to a spraying device and spraying, into a test chamber, a fluid that contains particles;
   measuring a measured value of a flow rate of the gas flow that is supplied to the spraying device;
   controlling, to a prescribed value, based on the measured value, the flow rate of the gas flow that is supplied to the spraying device;
   measuring a time interval over which the fluid that contains the particles is sprayed into the test chamber; and
   stopping the spraying of the fluid that contains the particles after a prescribed quantity of the particles has been sprayed into the test chamber.

7. The environment providing method as set forth in claim 6, wherein:
   in stopping the spraying of the fluid that contains the particles, a time interval for stopping the spraying of the fluid that contains the particles is set based on a product of a flow rate of the gas flow and a time interval over which the fluid that contains the particles is to be sprayed.

8. The environment providing method as set forth in claim 6, wherein:
   in stopping the spraying of the fluid that contains the particles, a time interval obtained through dividing, by a measured value for the flow rate of the gas flow that is controlled, a product of a flow rate of the gas flow and a time interval over which the fluid that contains the particles is to be sprayed, is set as a time interval for stopping the spraying of the fluid that contains the particles.

9. The environment providing method as set forth in claim 6, wherein:
   in stopping the spraying of the fluid that contains the particles, a time interval obtained through dividing, by a prescribed value for the flow rate of the gas flow, a product of a flow rate of the gas flow and a time interval over which the fluid that contains the particles is to be sprayed, is set as a time interval for stopping the spraying of the fluid that contains the particles.

10. The environment providing method as set forth in claim 6, wherein:
    the particles are microorganisms particles.

11. A method for evaluating a particle detecting device, comprising the steps of:
    supplying a gas flow to a spraying device and spraying, into a test chamber, a fluid that contains particles;
    measuring a measured value of a flow rate of the gas flow that is supplied to the spraying device;
    controlling, to a prescribed value, based on the measured value, the flow rate of the gas flow that is supplied to the spraying device;
    measuring a time interval over which the fluid that contains the particles is sprayed into the test chamber;
    stopping the spraying of the fluid that contains the particles after a prescribed quantity of the particles has been sprayed into the test chamber;
    detecting, using a particle detecting device, the particles that have been dispersed into the air within the test chamber; and
    evaluating the quantity of particles detected by the particles detecting device.

12. The method for evaluating a particle detecting device as set forth in claim 11, wherein:
    in stopping the spraying of the fluid that contains the particles, a time interval for stopping the spraying of the fluid that contains the particles is set based on a product of a flow rate of the gas flow and a time interval over which the fluid that contains the particles is to be sprayed.

13. The method for evaluating a particle detecting device as set forth in claim 11, wherein:
    in stopping the spraying of the fluid that contains the particles, a time interval obtained through dividing, by a measured value for the flow rate of the gas flow that is controlled, a product of a flow rate of the gas flow and a time interval over which the fluid that contains the particles is to be sprayed, is set as a time interval for stopping the spraying of the fluid that contains the particles.

14. The method for evaluating a particle detecting device as set forth in claim 11, wherein:
    in stopping the spraying of the fluid that contains the particles, a time interval obtained through dividing, by a prescribed value for the flow rate of the gas flow, a product of a flow rate of the gas flow and a time interval over which the fluid that contains the particles is to be sprayed, is set as a time interval for stopping the spraying of the fluid that contains the particles.

15. The method for evaluating a particle detecting device as set forth in claim 11, wherein:
   the particles are microorganisms particles.

* * * * *